(12) United States Patent
Westley et al.

(10) Patent No.: US 11,295,531 B1
(45) Date of Patent: Apr. 5, 2022

(54) SYSTEM AND METHOD FOR GENERATING INTERACTIVE VIRTUAL IMAGE FRAMES IN AN AUGMENTED REALITY PRESENTATION

(71) Applicants: Allison Cecile Westley, Palos Verdes Estates, CA (US); Ethan Bresnick, San Mateo, CA (US)

(72) Inventors: Allison Cecile Westley, Palos Verdes Estates, CA (US); Ethan Bresnick, San Mateo, CA (US)

( * ) Notice: Subject to any disclaimer, the term of this patent is extended or adjusted under 35 U.S.C. 154(b) by 0 days.

(21) Appl. No.: 17/329,794

(22) Filed: May 25, 2021

Related U.S. Application Data

(60) Provisional application No. 63/200,262, filed on Feb. 24, 2021.

(51) Int. Cl.
*G06T 19/00* (2011.01)
*G06F 3/16* (2006.01)
*G06F 3/01* (2006.01)
*G06T 13/00* (2011.01)

(52) U.S. Cl.
CPC ............ *G06T 19/006* (2013.01); *G06F 3/016* (2013.01); *G06F 3/16* (2013.01); *G06T 13/00* (2013.01)

(58) Field of Classification Search
CPC ....... G06T 19/006; G06T 13/00; G06F 3/016; G06F 3/16
See application file for complete search history.

(56) References Cited

U.S. PATENT DOCUMENTS

| | | | |
|---|---|---|---|
| 9,171,405 B1 | 10/2015 | Bell | |
| 9,183,676 B2 | 11/2015 | McCulloch | |
| 9,704,295 B2 | 7/2017 | Molyneaux | |
| 9,846,970 B2 | 12/2017 | Anderson | |
| 10,304,203 B2 | 5/2019 | Forutanpour | |
| 10,565,796 B2 | 2/2020 | Hagbi | |
| 10,706,615 B2 | 7/2020 | Ford | |
| 2017/0169598 A1 | 6/2017 | York | |
| 2017/0301145 A1* | 10/2017 | Miller | G06F 3/013 |
| 2018/0144555 A1* | 5/2018 | Ford | G06T 15/20 |
| 2018/0220265 A1 | 8/2018 | Helms | |
| 2018/0276882 A1 | 9/2018 | Harviainen | |
| 2019/0272676 A1 | 9/2019 | Finn | |
| 2020/0204726 A1 | 6/2020 | Ebsen | |

* cited by examiner

*Primary Examiner* — Chong Wu

(57) ABSTRACT

A method may integrate a two-dimensional digital image into a three-dimensional model, sourced by database or by capture of a physical object, and transform the digital image into an aperture in the three-dimensional model, wherein the aperture serves as an entry into a cavity within the model or captured physical object. The system can thereby generate three-dimensional virtual image frames that surround digital images in augmented reality (AR) environments, or frame transformed digital images within real-world physical objects in AR. The system may comprise a computing device that collects image data via image sensors and depth data via depth sensors in order to orient the virtual image frame(s). The system may use depth and image data in order to trigger haptic, audio, and visual effects through the computing device when proximal to the virtual image frame, so as to simulate the sensation of reaching through the virtual image frame.

20 Claims, 9 Drawing Sheets

SYSTEM AND METHOD FOR GENERATING INTERACTIVE VIRTUAL IMAGE FRAMES IN AN AUGMENTED REALITY PRESENTATION

CROSS-REFERENCE TO RELATED APPLICATIONS

This application claims an invention which was disclosed in Provisional Application No. 63/200,262, filed Feb. 24, 2021, entitled "System and method for generating interactive virtual image frames in an augmented reality presentation." The benefit under 35 USC § 119(e) of the United States provisional application is hereby claimed, and the aforementioned application is hereby incorporated herein by reference.

STATEMENT REGARDING FEDERALLY SPONSORED RESEARCH OR DEVELOPMENT

N/A

THE NAMES OF THE PARTIES TO A JOINT RESEARCH AGREEMENT

N/A

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

N/A

STATEMENT REGARDING PRIOR DISCLOSURES BY THE INVENTOR OR A JOINT INVENTOR

N/A

BACKGROUND OF THE INVENTION

Field of the Invention

The present invention pertains to the field of augmented reality (AR). More particularly, the invention pertains to the integration of two-dimensional digital images and three-dimensional models in AR.

Description of Related Art

Augmented reality (AR) consists primarily of digital visuals superimposed on the physical world through head-mounted displays or tablets. In recent years, the physical hardware on which AR is displayed has become increasingly accessible as headset prices have fallen and smart device capabilities have improved. However, the AR content necessary to populate these devices lags behind in progress. Some attempted solutions advertise their ability to enhance the physical world, but these applications fail to seamlessly integrate images into virtual and material architectures. Current AR interfaces render two-dimensional images as free-standing flat planes in the real-world environment, yet these techniques achieve the effect of merely viewing an image in a new context. The allure of AR exists in experiences that respond in real-time, evoke novel sensations, and dynamically adapt to the viewer. Many creators attempting to make this vision a reality currently rely on manual manipulation of AR assets to generate scenes, which is time consuming and inefficient. There exists a need to synthesize AR design processes into efficient software tools in order to catalyze the next generation of AR content.

BRIEF SUMMARY OF THE INVENTION

Embodiments of the present invention consist of systems and methods for the integration of two-dimensional images into dynamic, three-dimensional augmented reality (and/or virtual reality) frames.

In one embodiment of the present invention, a software method maps two-dimensional (2D) images onto the surfaces of three-dimensional (3D) augmented reality (AR) objects. This embodiment is classified as the virtual image frame, for the components of the experience are all digital. The software method first analyzes AR objects stored in a database. These objects may comprise 3D meshes that contain apertures through which users can move in the AR space. The software method crops and scales 2D digital images from the database to fit the dimensions of the AR object's aperture. The digital image is seamlessly fitted into a plane of the AR object so that the object in effect "frames" the 2D image. The user holds or wears a computing device that collects image data via image sensors and depth data via depth sensors, which orients the AR virtual image frame(s) into an AR environment.

In another embodiment, 3D meshes are generated from real-world objects rather than sourced from databases. This embodiment is classified as the captured object image frame, for the software frames transformed digital images inside of physical objects in the AR environment. The software method uses depth and image data from the user's computing device to generate a 3D representation of the physical object. The software method identifies apertures of sufficient area based on the surface topography of the object(s), whereby an aperture is defined as a sustained perimeter of uniform elevation/depth difference. After aperture dimensions are recorded, the software method crops and scales a digital image from the database to form a matte that fits the size of the AR object's aperture. The digital image is seamlessly fitted into a plane of the AR object so that the object has the effect of a 3D frame. The image and depth data collected by the user's computing device then orients the captured object image frame(s) into an AR environment.

The user device that gathers data to inform the orientation of AR objects and detects object apertures may consist of a head mounted display (HMD) computing device or tablet with Light Detection and Ranging (Lidar) capability.

Depth and image data provide the software method with information about proximity to the digital plane. When the user enters within close proximity to the AR image plane, various AR effects may be triggered to provide a crossover transition into another region of the AR environment. These distance-based effects may include haptic effects (through HMDs or other wearables), audio effects, and visual effects.

Users may interact with both virtual and captured object modes of this invention by physically reaching through or traversing the plane of the digital image into the open aperture space within the 3D object. In this way, the plane of a digital image serves as a surface covering the open interior aperture of a 3D object.

The embodiments of this invention may be overseen by an administrator who coordinates the AR environment experienced by viewers. Multiple users may synchronously interact with virtual and captured object image frames in the AR environment.

DETAILED DESCRIPTION OF THE INVENTION

Figure 1:
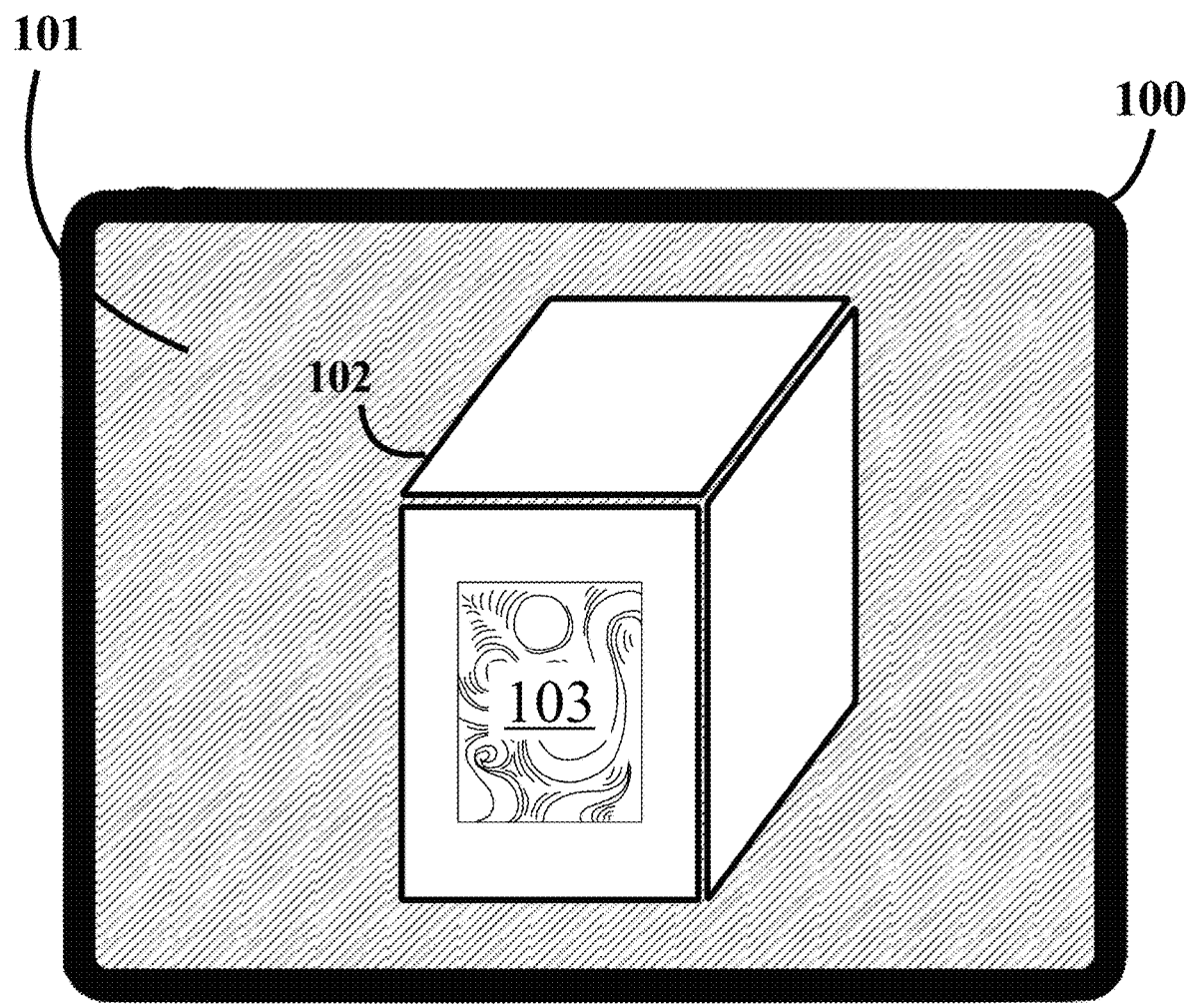
FIG. 1 is a conceptual drawing illustrating in a front view, a virtual frame on the display of a computing device, according to an embodiment.

Augmented reality (AR) is a type of presentation on a computing device with virtual content, often three-dimensional models, superimposed on image data captured by a rear-facing camera worn or held by the viewer. Alternatively, the computing device can render an AR presentation on a clear and transparent display or lens, without image data presented. A typical computing device for AR presentations is a smartphone with image sensors and depth sensors, a tablet computer with image sensors and depth sensors, or a face-worn computer with image sensors and depth sensors (e.g. head mounted display). Virtual content in an AR presentation consists of one or more three-dimensional models generated by software methods. Alternatively, virtual content in an AR presentation consists of one or more transformations of objects captured from depth data and image data, by one or more rear-facing depth sensors and image sensors, facing the environment and architecture in front of a user. Software methods can enhance objects captured in depth and image data by one or more processes to render an AR presentation.

In an embodiment, a virtual image frame can be generated from a three-dimensional model with an aperture and by transformations to a digital image. A three-dimensional model can be, but not limited to, solid primitives in an architectural scale. Apertures in the surface of a three-dimensional model can be, but not limited to, a rectangular shape (i.e. square hole), an oval shape (i.e. a tube), at a human scale that humans can pass through (e.g. open door, portal, open window).

In a multi-step software method, a three-dimensional model is retrieved from a database, and an aperture in the surface of a three-dimensional model is identified, measured by its interior perimeter, and then using the measured perimeter, a shape matte is reproduced. In an embodiment, a digital image can be a different shape and scale than the aperture and a matting process can modify the digital image shape and scale to the aperture shape. A digital image can be, but not limited to, photographs, reproductions of fine art, and computer-generated designs. In a multi-step software method, a digital image is retrieved from a database, and following the boundary of the aperture matte, the image is transformed to the aperture matte by one or more processes including, but not limited to, cropping and scaling. The transformed digital image is projected onto a planar surface and then using the source three-dimensional model, inserted into the open aperture. In an embodiment, the result of the software method is a generated three-dimensional model, wherein the digital image as a planar surface fills the space of the open aperture of a source three-dimensional model. In an embodiment, the generated virtual image frame is rendered in an AR presentation.

In a preferred embodiment, a transformed digital image can be generated by the three-dimensional surface data of a real world, physical object, wherein by rear-facing depth sensors, depth data, and by image sensors, image data, are captured from objects in front of the user. The physical objects captured can be, but not limited to, architecture in the surrounding environment with open passageways (e.g. open doorways, tunnels). Depth data and image data of the physical object are used to identify apertures in the surface. In an embodiment, a matte is generated of the boundary enclosing the aperture by measuring its shape from the captured three-dimensional surface. In an embodiment, a digital image is retrieved from a database. Processes including, but not limited to, cropping and scaling, transform the digital image to the aperture matte. In an embodiment, the transformed image is projected onto a flat planar surface and aligned in three-dimensional space to the location of the aperture in the captured three-dimensional surface data of the physical object. In an embodiment, an augmented reality presentation on the display of the computing device renders the transformed and aligned digital image superimposed on image data of the rear-facing camera, wherein the composite aligned digital image fills the open aperture of the real world, physical object.

Overview of Virtual Image Frame in an Augmented Reality Presentation Concept FIG. 1 is a conceptual drawing, illustrating in a front view, the virtual image frame in an augmented reality presentation on the display of a computing device (i.e. tablet). Computing Device 100 is shown in a front view of its display. A Computing Device 100 may have a computing device processor. When the software method is running on the computing device processor, Three-Dimensional Model 102, derived from a database, is analyzed to detect an aperture in its surface, which is then measured, as is further illustrated in FIGS. 6A-6D. Digital Image 103 is transformed to the aperture matte and inserted into the open aperture hole as a planar surface, as further described in FIG. 4. Digital Image 103 is inserted into the aperture of Three-Dimensional Model 102. The generated model, a virtual image frame, is superimposed on Image Data 101. Image Data 101 is shown retrieving from a rear-facing, opposite the user, image sensor. Computing Device 100 shows on its display, the virtual image frame, consisting of Three-Dimensional Model 102 and Transformed Digital Image 103, over Image Data 101 of the surrounding, real world environment.

Example of a Scanned Physical Object and Distance Activated Effects

Figure 2:
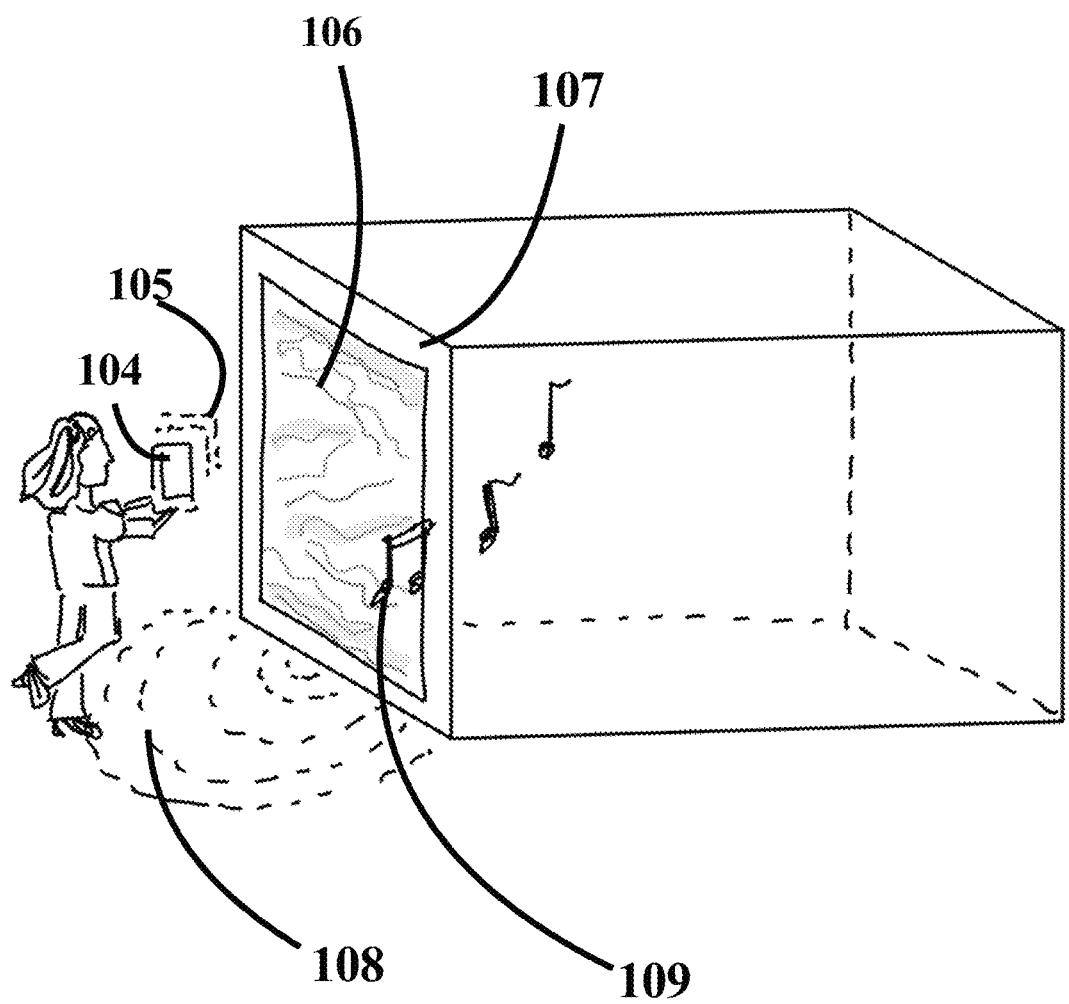
FIG. 2 is a conceptual drawing illustrating the side view of an augmented reality presentation with effects activated at distances between the computing device and a virtual image frame, according to an embodiment.

FIG. 2 is a conceptual drawing of a preferred embodiment from a side view. In the example, Computing Device 104 captures, via depth sensors and image sensors, the physical, real-world architecture of Wall 107 with an open, rectangular aperture in its surface. When the software method is running, the captured model of Wall 107 is analyzed for an aperture in its surface, and when the open rectangular aperture is detected, measurements of the open cavity behind the aperture generate a matte, as described further in FIG. 5. Digital Image 109 is cropped and scaled to the aperture matte of the captured model of Wall 109. Digital Image 109 is aligned to the aperture of the physical, real-world surface of Wall 109 in image data and depth data, and the augmented reality presentation of the aligned Digital Image 109 is superimposed on image data from the rear-facing image sensor of Computing Device 104 and displayed on the front facing visual display.

In a preferred embodiment, at Distances 108 between Computing Device 104 and Wall 107, effects are activated in the augmented reality presentation. Computing Device 104 displays visual effects on its front-facing display when activated at Distances 108 between Computing Device 104 and Wall 107, measured by image sensor and depth sensors on Computing device 104. In the example, Computing Device 104 contains haptic actuators and audio speakers. At Distances 108, Haptic Effects 105 are activated. At Distances 108, audio effects are activated, as symbolized by Music Notes 109.

In another embodiment, the Computing Device 104 can collide with the virtual image frame in the augmented reality presentation. When at minimum Distance 108 from the Virtual Image Frame 106, the following effects can activate on the computing device: visual particles, audio notes, and haptic vibrations. Users may traverse the virtual image frame or reach through the virtual image frame in order to trigger these effects. After passing through an AR image plane, additional three-dimensional AR animations may ensue, including transformations of the object vessel itself.

Example System for Generating and Visualizing Virtual Image Frames

Figure 3:
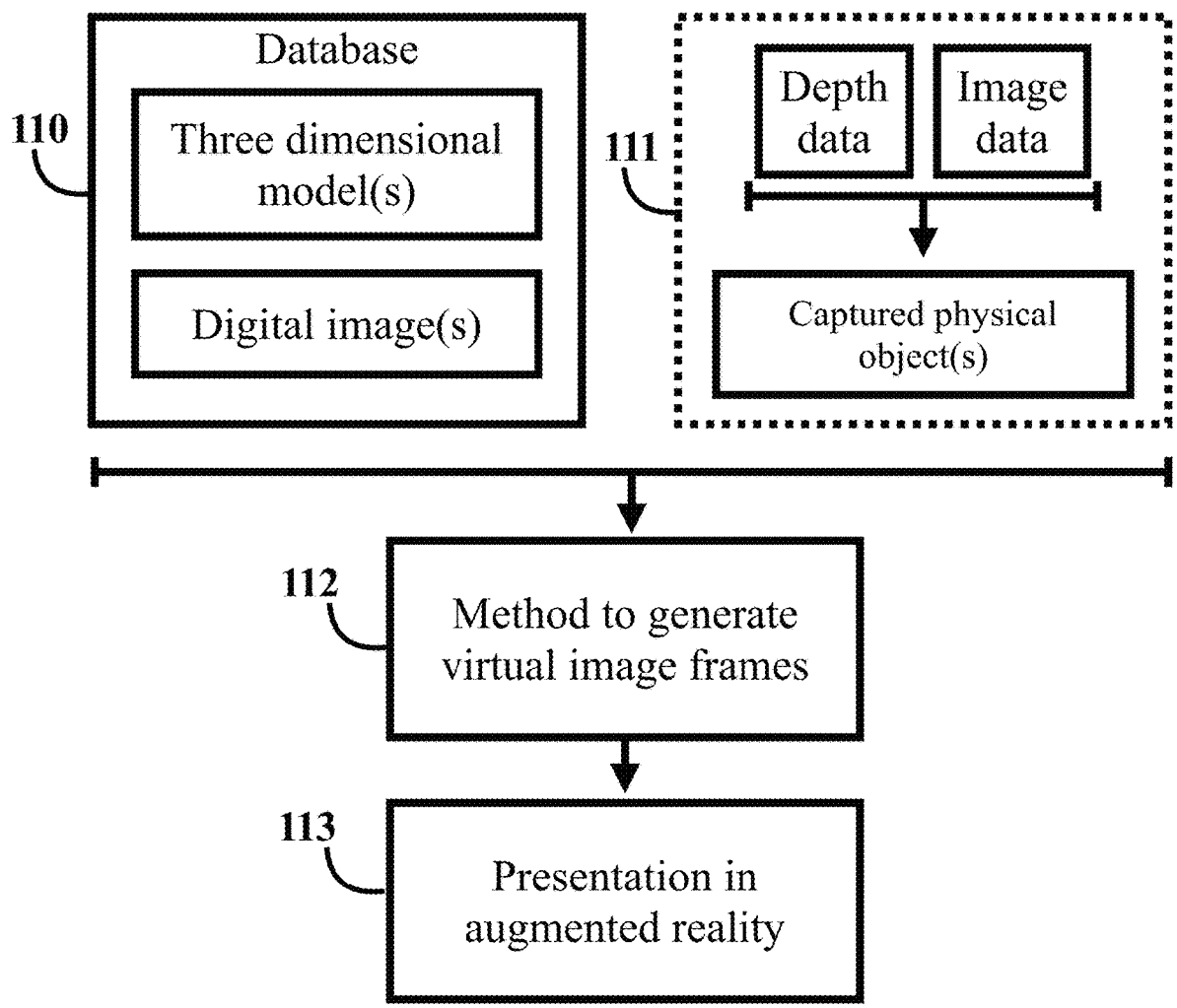
FIG. 3 is a block diagram illustrating a system for generating and visualizing virtual image frames based on three-dimensional models and captured objects, according to an embodiment.

FIG. 3 is a block diagram illustrating elements of the overarching system that generates virtual image frames and renders the content in an augmented reality presentation, as illustrated in FIG. 1. In an embodiment, Generative Method 112 retrieves three-dimensional models and digital images from Database 110, a repository on the device local memory or a remote memory subsystem. As further described in FIG. 4, Database 110 can include three-dimensional models, recorded in various formats, and digital images, in various formats. In an embodiment, Generative Method 112 can produce virtual image frames entirely from content stored in Database 110. Virtual image frames are generated by contents of Database 110, and the steps are further described in FIG. 4. In an embodiment, Augmented Reality Presentation 113 renders virtual image frames from Generative Method 112 in front of image data collected via image sensor on a computing device display, as illustrated in FIG. 1.

Figure 5:
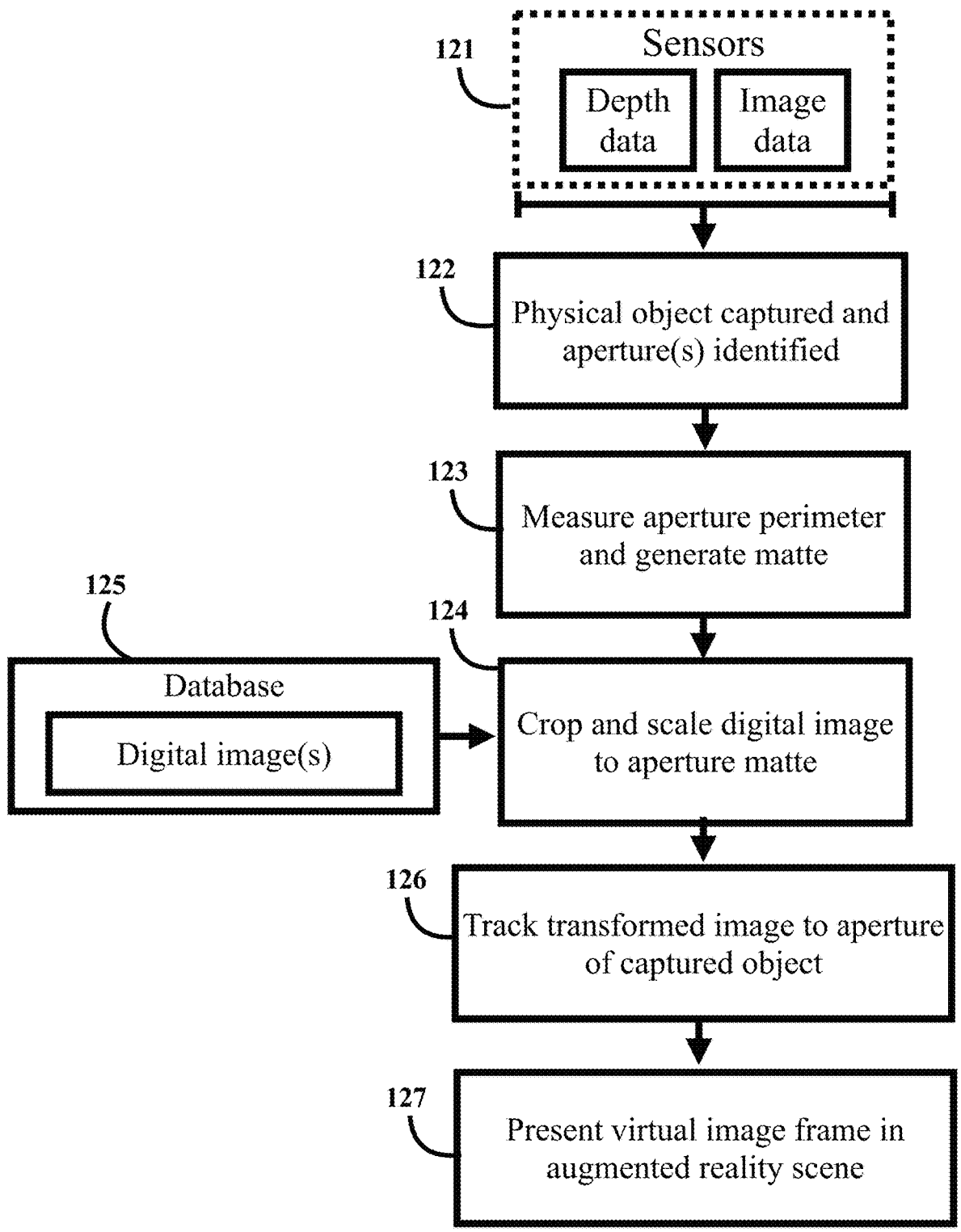
FIG. 5 is a flow diagram illustrating steps of a software method to generate a virtual image frame in an augmented reality presentation from a captured physical object and a digital image, according to an embodiment.

Alternatively, Generative Method 112 can produce a virtual image frame from a real-world, physical object in Capture Process 111, wherein image data by image sensor and depth data by depth sensor are utilized to capture a physical object surface and generate its corresponding three-dimensional model, as further described in FIG. 5. For example, the physical object can be captured by depth sensor to aggregate a point cloud of coordinates from the object surface, or photogrammetric process by image sensor, analyzing geometry from a sequence of image data. Generative Method 112 can generate transformed digital images, by Capture Process 111 and using digital images from Database 110. This step is further described in FIG. 5. In an embodiment, Augmented Reality Presentation 113 can display an aligned and transformed digital image of Generative Method 112. Augmented Reality Presentation 113 can be comprised of aligned and transform digital image of Generative Method 112 superimposed on image data by image sensor, wherein the aligned and transformed digital image of Generative Method 112 appears to fill the aperture of captured three-dimensional model of Capture Process 111, as illustrated in an embodiment in FIG. 2.

Figure 4:
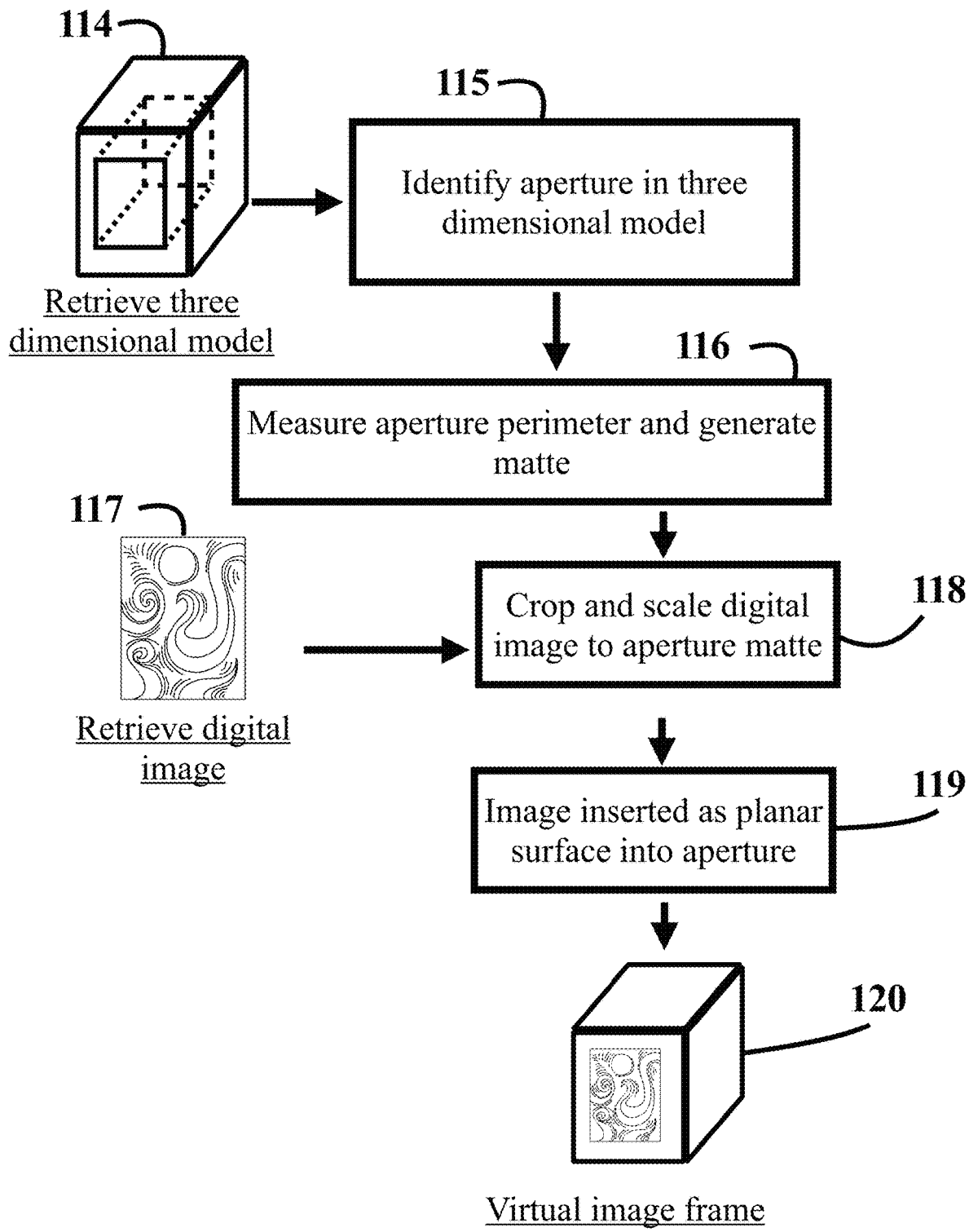
FIG. 4 is a flow diagram illustrating steps of a software method to generate a virtual image frame from a three-dimensional model and a digital image, according to an embodiment.

Example Method to Generate Virtual Image Frames from Database Three-Dimensional Models FIG. 4 is a flow diagram illustrating the steps to generate a Virtual Image Frame 120 by Retrieve Three-Dimensional Model 114 from a database and by Retrieve Digital Image 117 from a database. The flow diagram details the steps of the Generative Method referenced in FIG. 3. In an embodiment, the method starts by Retrieve Three-dimensional Model 114. For example, three-dimensional models in various formats can include indices of vertex coordinates, point clouds of exterior surface coordinates, vector shapes of the volume, color data assigned to points on exterior surface, and surface projection. The models can be uploaded into the database on computing device memory by processes, for example, transfer of data by another computing device, remote memory devices, and wireless communication systems. Three-dimensional models can be retrieved from the database (i.e. downloaded) when running the augmented reality presentation or one or more commands to the computing device are activated. By this step of retrieving a model, subsequent steps can read (i.e. interpret) and write to (i.e. modify) the retrieved three-dimensional model (i.e. source three-dimensional model).

Figure 6A:
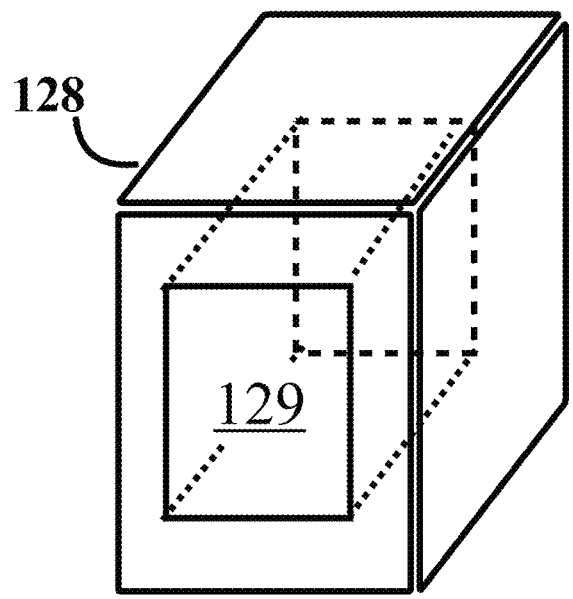
FIGS. 6A-6D illustrate a multi-step process for generating a virtual image frame, according to an embodiment.

The following step can interpret the source three-dimensional model in order to Identify Aperture in Three-dimensional Model 115. This step uses one or more processes to analyze the data of Retrieve Three-dimensional Model 114 (i.e., source three-dimensional model). Identify Aperture in Three-dimensional Model 115 can generate the coordinates of an aperture, an open cavity of empty volume, in the surface of the source three-dimensional model, as illustrated in FIG. 6A. and FIG. 7A. In an embodiment, the process of identifying an aperture in the surface can include, but not limited to, comparing the number of vertices, edges, and faces on the surface to a threshold value. When the entirety or portions of the geometry of the source three-dimensional model are greater than or equal to the threshold value, an aperture can be identified, and its location recorded in indices. In an embodiment, the process of identifying an aperture in the surface can include, but is not limited to, analyzing point cloud data, whereby a suitable aperture constitutes a sustained perimeter of uniform point elevation difference that encloses a pre-programmed surface area (i.e., $\geq 10$ cm$^2$). Alternatively, Identify Aperture in Three-dimensional Model 115 can include processes including, but not limited to, simulated watertight testing, analysis of surface projection, or analysis of image renderings. Based on the aperture and its location by Identify Aperture in Three-dimensional Model 115, further steps can read and write to the source three-dimensional model at the aperture location.

Figure 7A:
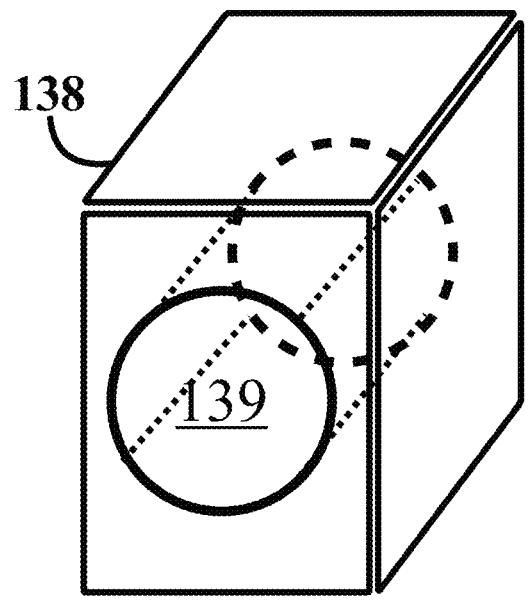
FIGS. 7A-7D illustrate a multi-step process for generating a virtual image frame, according to an embodiment.

Based on coordinates of an aperture in the source three-dimensional model by Identify Aperture and Three-dimensional Model 115, the enclosing boundary of an aperture can generate a shape matte by Measure Aperture Perimeter and Generate Matte 116. In an embodiment, Measure Aperture Perimeter and Generate Aperture Matte 116 can be conducted by processes including, but not limited to, recording an index of the length of edges around the enclosing boundary aperture by location of Identify Aperture in Three-dimensional Model 115 in computing device memory. In an embodiment, the indices of the number and length of edges around the aperture-enclosing boundary in computing device memory accurately reproduces the shape of the aperture-enclosing boundary. For example, in a solid cube with an aperture as a hollow cylindrical prism (i.e., a tube cutout through the volume of a cube), the circumference of the cylindrical aperture is measured by the number and length of its enclosing edges, in this example, the boundary is a circumference as illustrated in FIG. 7A. The index of the aperture circumference is the shape of the circular boundary enclosing the aperture. The process of Measure Aperture Perimeter and Generate Matte 116 functions on aperture shapes of any number of edges, or along the path of a vector shape.

In an embodiment, the shape of an aperture by its number and length of edges can reproduce an accurate shape matte. The shape matte of Measure Aperture Perimeter and Generate Matte 116 can translate the measured shape of the aperture to any digital graphic. The shape matte generated by the measured shape of this process can be, but not limited to, a vector shape, a digital image, or indices of vertices, edges, and dimensions.

As referenced in Retrieve Three-dimensional Model 114, contents of the database as Illustrated in FIG. 3, can be retrieved from computing device memory. Retrieve Digital Image 117 reads a digital image, accepted in various formats, for the generative method for a Virtual Image Frame 120. Retrieve Digital Image 117 step allows the process to further modify and incorporate a digital image from the database (i.e., source digital image) into the generated Virtual Image Frame 120.

Crop and Scale Digital Image to Aperture Matte 118 incorporates the source digital image of Retrieve Digital Image 117 to generate a transformed digital image that fits the aperture shape matte by processes of transformation, from shape matte of Measure Aperture and Generate Matte 116 (i.e., aperture matte). In an embodiment, transformation processes of Crop and Scale Digital Image to Aperture Matte 118 can include, but not limited to, scaling the source digital image, stretching the source digital image, adjusting the dimensions of the source digital image to the aperture matte. Transformation processes matting the source digital image to the aperture shape can additionally include, but not limited to, adding or removing pixels from a digital image (i.e., trimming), reducing the area of image dimensions (i.e., cropping), and adding pixels with transparency (e.g., alpha channels). As further illustrated in FIG. 6C and FIG. 7C, the step generates a transformed digital image by the aperture matte in scale and shape, wherein in the transformed digital image generated by this step matches the source three-dimensional model aperture boundary by scale and shape.

Based on the transformed digital image, the subsequent step incorporates the transformed digital image by Retrieve Image 117 and Crop and Scale Digital Image to Aperture Matte 118 to enhance the form of the source three-dimensional model of Retrieve Three-dimensional Model 114. This step, Image Inserted As Planar Surface Into Aperture 119, translates the transformed digital image into the three-dimensional format of the source three-dimensional model. In contrast, the transformed digital image of Crop and Scale Digital Image to Aperture Matte 118 is often recorded in a two-dimensional format, color pixels plotted by length and width, often without a depth axis to the pixels. In an embodiment, the step to translate the transformed digital image into three-dimensional format of the source three-dimensional model can include, but not limited to, projection onto a plane, projection onto a polygon solid, and extrusion of an image plane. This step generates a three-dimensional planar object from the transformed digital image of preceding steps, wherein the transformed digital image is projected on a plane (e.g., image canvas, printed photo, billboard).

The planar object can be merged with the source three-dimensional model of Retrieve Three-dimensional Model 114 in order to generate a Virtual Image Frame 120. In an embodiment, the planar object can be translated in three-dimensional space to the coordinates of the aperture location recorded in Identify Aperture in Three-Dimensional Model 115. Alignment of the planar image object to the location of the aperture creates the appearance of the transformed digital image on the planar surface filling the aperture hole. As further illustrated in FIG. 6D and FIG. 7D, the insertion of the image plane, with the shape matte accurately transforming it to the aperture shape, creates a realistic appearance that the image fills the open cavity. This step generates a merged three-dimensional dimensional model of the source three-dimensional model and the image on a planar surface, aligned to the location of the aperture.

Virtual Image Frame 120 is a new three-dimensional model generated by the subsequent steps of this method. Virtual Image Frame 120 is comprised of the transformed source digital image, from Retrieve Digital Image 117, filling the aperture hole of the source three-dimensional model, from Retrieve Three-dimensional Model 114.

Example Method to Generate Virtual Image Frames from Captured Three-Dimensional Models of Physical Objects FIG. 5 is a flow diagram illustrating the steps to Present Virtual Image Frame in Augmented Reality Scene 127 by integrating the digital image into a physical environment detected by Sensors 121. The flow diagram details the steps of the Generative Method referenced in FIG. 3 for Captured Physical Objects. In an embodiment, the method starts with collected depth and image data from computing device Sensors 121, which is then analyzed in Physical Object Captured and Aperture(s) Identified 122. In this step, the software method first analyzes depth and image data to create a point cloud model of the physical object, thereby translating it into a digital format. For example, the physical object can be captured by depth sensor to aggregate a point cloud of coordinates from the object surface, or photogrammetric process by image sensor, analyzing geometry from a sequence of image data.

The method then locates suitable aperture(s) in the captured three-dimensional model. In an embodiment, the process of identifying an aperture in the surface can include, but is not limited to, analyzing point cloud data, whereby a suitable aperture constitutes a sustained perimeter of uniform point elevation difference that encloses a pre-programmed surface area (i.e., ≥10 cm²). In an embodiment, the process of identifying an aperture in the surface can alternatively include, but is not limited to, comparing the number of vertices, edges, and faces on the surface to a threshold value. When the entirety or portions of the geometry of the source three-dimensional model are greater than or equal to the threshold value, an aperture can be identified, and its location recorded in indices. The model is then stored in the memory of the computing devices, and subsequent steps can read (i.e., interpret) and write to (i.e., modify) the retrieved three-dimensional model with its identified aperture(s) (i.e., captured three-dimensional model).

The following step can interpret the source three-dimensional model in order to Measure Aperture Perimeter and Generate Matte 123. This step uses one or more processes to analyze the data of Physical Object Captured and Aperture(s) Identified 122 (i.e., captured three-dimensional model). Measure Aperture Perimeter and Generate Matte 123 can generate the coordinates of an aperture, opening into a cavity of empty volume, in the surface of the captured three-dimensional model, as illustrated in FIG. 6A. and FIG. 7A. Based on coordinates of an aperture in the captured three-dimensional model by Physical Object Captured and Aperture(s) Identified 122, the enclosing boundary of an aperture can generate a shape matte by Measure Aperture Perimeter and Generate Matte 123. In an embodiment, Measure Aperture Perimeter and Generate Aperture Matte 123 can determine aperture perimeter by processes including, but not limited to, recording an index of the length of edges around the enclosing boundary aperture by location of the aperture(s) located in Physical Object Captured and Aperture(s) Identified 122 in computing device memory. In an embodiment, the indices of the number and length of edges around the aperture-enclosing boundary in computing device memory accurately reproduces the shape of aperture-enclosing boundary. The process of Measure Aperture Perimeter and Generate Matte 123 functions on aperture shapes of any number of edges, or along the path of a vector shape.

In an embodiment, the shape of an aperture by its number and length of edges can reproduce an accurate shape matte. The shape matte of Measure Aperture Perimeter and Generate Matte 123 can translate the measured shape of the aperture to any digital graphic. The shape matte generated by the measured shape of this process can be, but not limited to, a vector shape, a digital image, or indices of vertices, edges, and dimensions.

As referenced in FIG. 3, contents of the Database 125, containing digital image(s), can be retrieved from computing device memory. Using the same method described in FIG. 4, the method can select a database image that will be further modified and incorporated into the virtual image frame. Crop and Scale Digital Image to Aperture Matte 124 incorporates the source digital image from Database 125 to generate a transformed digital image that fits the aperture shape matte by processes of transformation, from shape matte of Measure Aperture and Generate Matte 123 (i.e., aperture matte). In an embodiment, transformation processes of Crop and Scale Digital Image to Aperture Matte 124 can include, but are not limited to, scaling the source digital image, stretching the source digital image, adjusting the dimensions of the source digital image to the aperture matte. Transformation processes matting the source digital image to the aperture shape can additionally include, but not limited to, adding or removing pixels from a digital image (i.e., trimming), reducing the area of image dimensions (i.e., cropping), and adding pixels with transparency (e.g. alpha channels). As further illustrated in FIG. 6C and FIG. 7C, the step generates a transformed digital image by the aperture matte in scale and shape, wherein in the transformed digital image generated by this step matches the captured three-dimensional model aperture boundary by scale and shape.

Based on the transformed digital image, the subsequent step incorporates the transformed digital image by Crop and Scale Digital Image to Aperture Matte 124 to enhance the form of the physical object detected by Sensors 121. This step, Track Transformed Image to Aperture of Captured Object 126, translates the transformed digital image into the three-dimensional format of the captured physical object. In contrast, the transformed digital image of Crop and Scale Digital Image to Aperture Matte 124 is often recorded in a two-dimensional format, color pixels plotted by length and width, often without a depth axis to the pixels. In an embodiment, the step to translate the transformed digital image into three-dimensional format of the captured three-dimensional model can include, but is not limited to, projection onto a plane, projection onto a polygon solid, and extrusion of an image plane. This step generates a three-dimensional planar object from the transformed digital image of preceding steps, wherein the transformed digital image is projected on a plane detected in the physical environment (e.g., image canvas, printed photo, billboard).

The planar object can then be aligned with the captured three-dimensional model of Physical Object Captured and Aperture(s) Identified 122 in order to Present Virtual Image Frame in Augmented Reality Scene 127. In an embodiment, the planar object can be translated in three-dimensional space to the coordinates of the aperture location recorded in Physical Object Captured and Aperture(s) Identified 122. Alignment of the planar image object to the location of the physical aperture creates the appearance of the transformed digital image on the planar surface filling the aperture hole. As further illustrated in FIG. 6D and FIG. 7D, the insertion of the image plane, with the shape matte accurately transformed to the aperture shape, creates a realistic appearance that the image fills the open cavity. This step generates the effect of a merged digital image on the surface of a physical object, aligned to the location of the aperture.

Present Virtual Image Frame in Augmented Reality Scene 127 results in an augmented reality scene comprised of the transformed source digital image, from Database 125, which fills the aperture hole of the physical object, from Sensors 12. In an embodiment, an augmented reality presentation can be rendered by one or more arrangements including, but not limited to, rendering the transformed and aligned image of prior in front of real-time image data by image sensor on the display of a computing device. Alternatively, the augmented reality presentation can be rendered without image data, by a semi-transparent display that reveals the surrounding, real-world object that the depth sensors face. The method consistently repeats based on new data from Sensors 121 as the user moves throughout the environment so that the virtual image in augmented reality remains aligned with its physical aperture.

Example Generative Method for Rectangular Aperture

FIGS. 6A-6D illustrate in a perspective view, the multi-step process for generating a virtual image frame, as referenced in FIG. 4 and in FIG. 5, according to an embodiment. In the example shown in FIG. 6A, Cube 128 is a three-dimensional model that the generative method retrieves from a database, a step further described in FIG. 4. Alternatively, the three-dimensional model of Cube 128 can be retrieved by a capture process, in which Cube 128 exists as an object in the physical, real-world environment and is captured digitally by one or more processes. As further described in FIG. 5, image data and depth data of a computing device with rear facing, opposite the user, sensors face the physical object to be digitally captured as a three-dimensional model.

In the example shown in FIG. 6A, the exterior surface of Cube 128 has an Aperture 129. Aperture 129 is a hollow cavity through the solid cube. Aperture 129 has an interior area of a rectangular prism that maintains the scale of the rectangle enclosing boundary through the volume and on the rear side of Cube 128, opposite the perspective view.

Figure 6B:
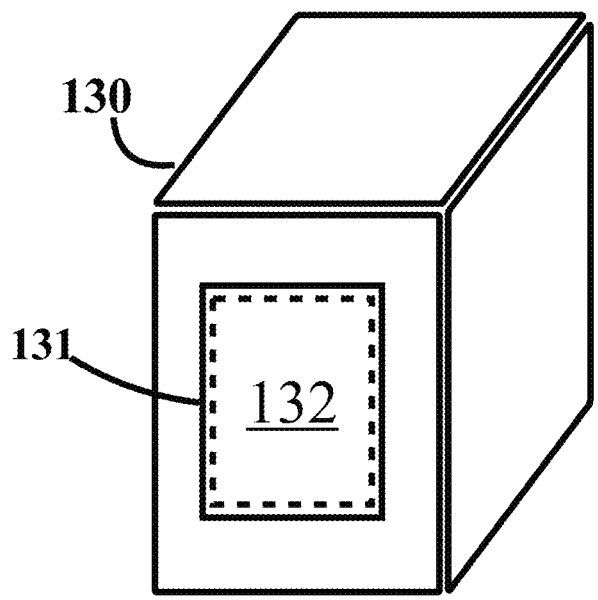
Figure 6C:
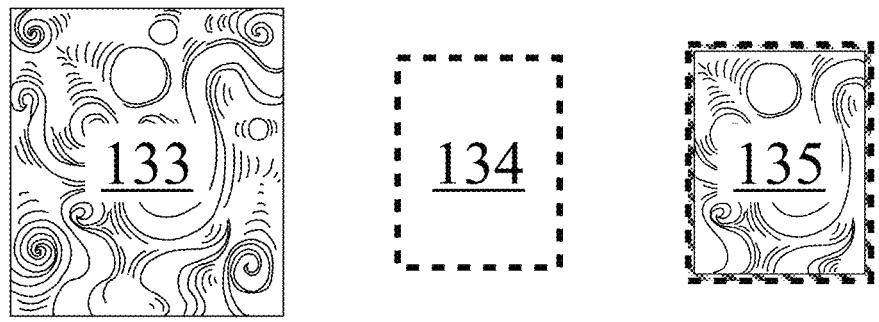

In reference to FIG. 6B and FIG. 6C, Aperture 131 in Cube 130 can be identified and then generate an Aperture Shape Matte 134 of Aperture 131 by measuring the Interior Boundary 132 of Cube 130. In an embodiment, processes to identify Aperture 131 can include, but not limited to, surface threshold analysis, simulated watertight testing, and surface projection, as further described in FIG. 4 and in FIG. 5. In an embodiment, processes to measure Interior Boundary 132 to generate Aperture Shape Matte 134 can include, but not limited to, recording the number and length of edges in an index, recording coordinates of vertices along Interior Boundary 132 in an index, paths of a vector shape, and interior boundary path by surface projection of a three-dimensional model. The geometry of Interior Boundary 132 is recorded in computing device memory to reproduce the perimeter of Aperture 131 in Aperture Shape Matte 134.

Aperture Shape Matte 134 can transform digital graphics by a matte process that applies the shape and scale of Aperture Shape Matte 134 to a source digital graphic by one or more processes. For example, Digital Image 133, as referenced in an embodiment in FIG. 6C, is retrieved from a database in computing device memory, as further described in FIG. 4. Digital Image 133 is a different shape and scale than Aperture Shape Matte 134. Image 133 can be matted by processes including, but not limited to, cropping, trimming, adding and removing pixels, adding pixels by transparency (alpha channels), as further described in FIG. 4. The result of the matte process is Transformed Digital Image 135 that fits the shape and scale of Aperture Shape Matte 134.

Figure 6D:
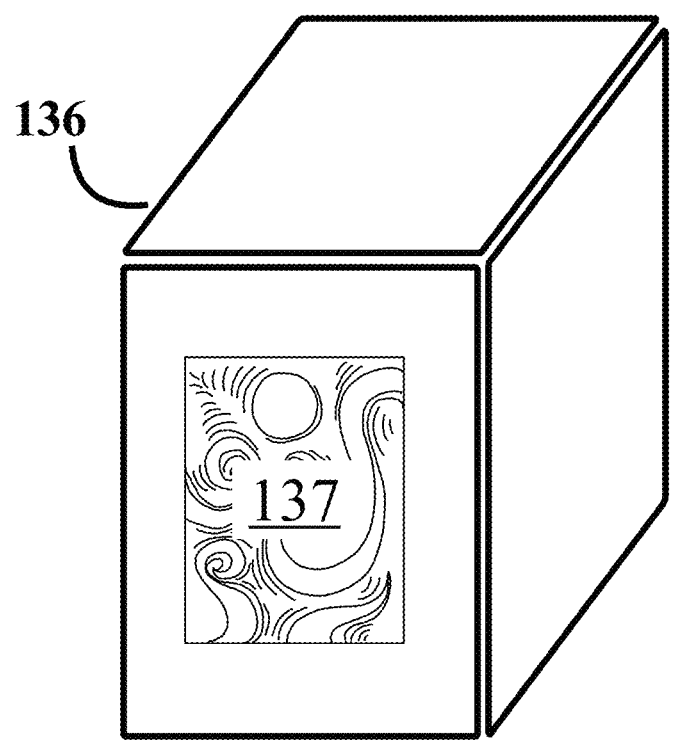

In reference to FIG. 6D, Transformed Digital Image Plane 137 is the transformed digital image result of the matte process, as illustrated in FIG. 6C, projected onto a flat planar surface in the three-dimensional space of Cube 136. Transformed Digital Image Plane 137 is aligned in three-dimensional space (i.e. spatial translation) to the aperture coordinate identified in the aperture identification step, as referenced in FIG. 6B and further described in FIG. 4 and in FIG. 5. By aligning Transformed Digital Image Plane 137 to aperture location in Cube 136, referenced in FIG. 6A, the generated three-dimensional model, called a virtual image frame, has the appearance that Transformed Digital Image Plane 137 fills the aperture. The aperture of Cube 136 frames Transformed Digital Image Plane 137.

Example Generative Method for Oval Aperture

FIGS. 7A-7D illustrate in a perspective view, the multi-step process for generating a virtual image frame, as referenced in FIG. 4 and in FIG. 5, according to an embodiment. In the example shown in FIG. 7A, Cube 138 is a three-dimensional model that the generative method retrieves from a database, a step further described in FIG. 4. Alternatively, the three-dimensional model of Cube 138 can be retrieved by a capture process, in which Cube 138 exists as an object in the physical, real-world environment and is captured digitally by one or more processes. As further described in FIG. 5, image data and depth data of a computing device with rear facing, opposite the user, sensors face the physical object to be digitally captured as a three-dimensional model.

In the example shown in FIG. 7A, the exterior surface of Cube 138 has an Aperture 139. Aperture 139 is a hollow cavity through the solid cube. Aperture 139 has an interior area of a cylindrical prism that maintains the scale of the oval enclosing boundary through the volume and on the rear side of Cube 138, opposite the perspective view.

Figure 7B:
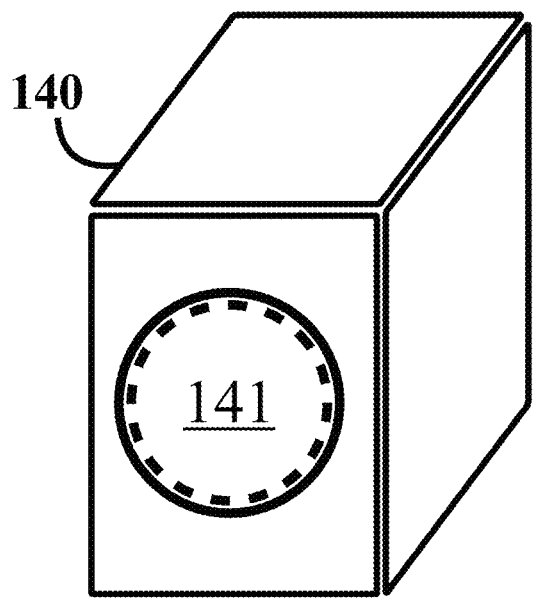
Figure 7C:
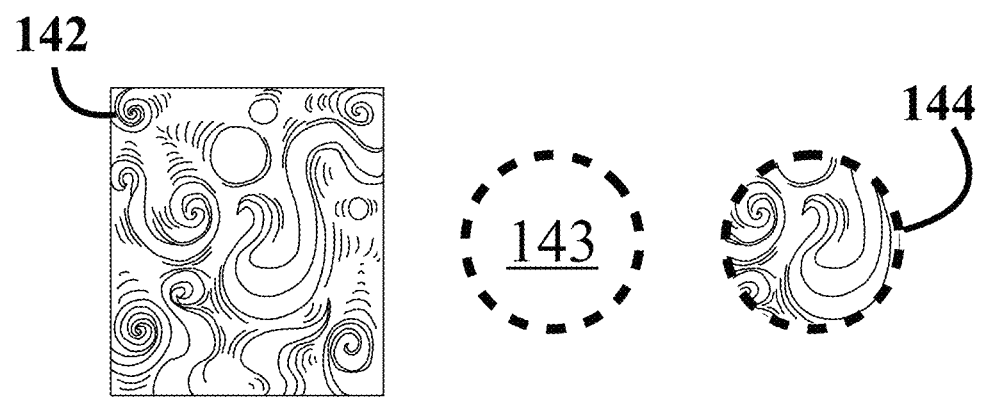

In reference to FIG. 7B and FIG. 7C, Aperture 139 in Cube 140 can be identified and then generate an Aperture Shape Matte 143 of Aperture 139 by measuring the Interior Boundary 141 of Cube 140. In an embodiment, processes to identify Aperture 139 can include, but not limited to, surface threshold analysis, simulated watertight testing, and surface projection, as further described in FIG. 4 and in FIG. 5. In an embodiment, processes to measure Interior Boundary 141 to generate Aperture Shape Matte 143 can include, but not limited to, recording the number and length of edges in an index, recording coordinates of vertices along Interior Boundary 141 in an index, paths of a vector shape, and interior boundary path by surface projection of a three-dimensional model. The geometry of Interior Boundary 141 is recorded in computing device memory to reproduce the circumference of Aperture 139 in Aperture Shape Matte 143.

Aperture Shape Matte 143 can transform digital graphics by a matte process that applies the shape and scale of Aperture Shape Matte 143 to a source digital graphic by one or more processes. For example, Digital Image 142, as referenced in an embodiment in FIG. 7C, is retrieved from a database in computing device memory, as further described in FIG. 4. Digital Image 142 is a different shape and scale than Aperture Shape Matte 143. Image 142 can be matted by processes including, but not limited to, cropping, trimming, adding and removing pixels, adding pixels by transparency (alpha channels), as further described in FIG. 4. The result of the matte process is Transformed Digital Image 144 that fits the shape and scale of Aperture Shape Matte 143.

Figure 7D:
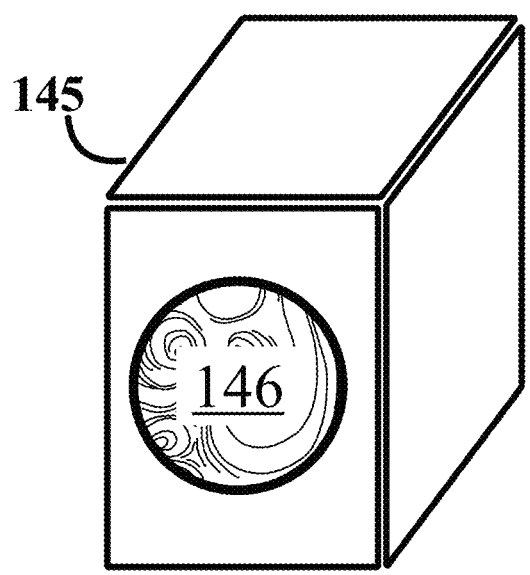

In reference to FIG. 7D, Transformed Digital Image Plane 146 is the transformed digital image result of the matte process, as illustrated in FIG. 7C, projected onto a flat planar surface in the three-dimensional space of Cube 145. Transformed Digital Image Plane 146 is aligned in three-dimensional space (i.e. spatial translation) to the aperture coordinate identified in the aperture identification step, as referenced in FIG. 7B and further described in FIG. 4 and in FIG. 5. By aligning Transformed Digital Image Plane 146 to aperture location in Cube 145, referenced in FIG. 7A, the generated three-dimensional model, called a virtual image frame, has the appearance that Transformed Digital Image Plane 146 fills the aperture. The aperture of Cube 145 frames Transformed Digital Image Plane 146.

What is claimed is:
1. A method for generating and displaying an augmented reality presentation, comprising:
 a computing device, comprising an image sensor, a computing device memory, a computing device processor, and a display;

wherein said computing device memory further comprises a database containing at least one of three-dimensional digital models and digital images;
wherein said computing device processor retrieves at least one said digital three-dimensional model from said database;
analyzes said digital three-dimensional model for an aperture;
measures a perimeter of said aperture;
generates a matte of said aperture;
retrieves a digital image from said database;
transforms said digital image to fit said matte of said aperture by at least one method of removing and adding pixels;
inserts said transformed digital image into said aperture to create a planar surface of a three-dimensional virtual image frame;
and presents at least one virtual image frame on said display of the computing device superimposed on a user's physical environment captured by said image sensor.

2. The method of claim 1, wherein said digital images of said database are uploaded by an independent computing device.

3. The method of claim 1, wherein said added pixels have varying alpha channel values.

4. The method of claim 1, further comprising measuring a distance between said computing device and coordinates of said superimposed virtual image frame, based on image data and depth data, by said computing device processor;
activating effects on said computing device at one or more pre-determined distances relative to the virtual image frame.

5. The method of claim 4, further comprising moving said computing device through at least one plane of a virtual image frame;
wherein said effects comprise a combination of audio output from at least one speaker in said computing device, haptic vibrations by at least one vibrating actuators in said computing device, and animations on said display of said computing device.

6. The method of claim 4, wherein a system administrator coordinates synchronous interaction with at least one superimposed virtual image frame by multiple users using independent computing devices.

7. The method of claim 4, wherein at least one said aperture is dynamically transformed in direct response to a user moving through said virtual image frame superimposed in said user's physical environment.

8. The method of claim 4, wherein said effects comprise audio output from at least one speaker in said computing device.

9. The method of claim 4, wherein said effects comprise haptic vibrations by at least one vibrating actuators in said computing device.

10. A method for generating and displaying virtual image frames within physical objects in an augmented reality presentation, comprising:
a computing device, comprising an image sensor, a depth sensor, a computing device memory, a computing device processor, and a display;
wherein said computing device further comprises a database in the computing device memory containing at least one digital image;
wherein said image sensor gathers image data and said depth sensor gathers spatial data of a physical three-dimensional captured object;
wherein said computing device identifies an aperture in a surface of said captured object;
measures a perimeter of said aperture;
generates a matte of said aperture;
retrieves a digital image from said database;
transforms said digital image to fit said matte of said aperture;
aligns said transformed digital image to said physical three-dimensional object to obtain a captured object virtual image frame;
and presents at least one captured object virtual image frame on said display of said computing device superimposed on a user's physical environment captured by said image sensor.

11. The method of claim 10, wherein a system administrator coordinates synchronous interaction with at least one superimposed captured object virtual image frame by multiple users using independent computing devices.

12. The method of claim 10, wherein said digital image transformation comprises extrusion of an image plane.

13. The method of claim 10, further comprising measuring distance between said computing device and coordinates of said superimposed captured object virtual image frame, based on image data and depth data, by said computing device processor;
activating effects on said computing device at one or more pre-determined distances relative to the captured object virtual image frame.

14. The method of claim 13, further comprising moving said computing device through at least one plane of the captured object virtual image frame;
wherein said effects comprise a combination of audio output from at least one speaker in said computing device, haptic vibrations by at least one vibrating actuator in said computing device, and animations on said display of said computer device.

15. The method of claim 13, wherein at least one said aperture is dynamically transformed in response to a user moving through said captured object virtual image frame superimposed in said user's real-world environment.

16. The method of claim 13, wherein said effects comprise audio output from at least one speaker in said computing device.

17. The method of claim 13, wherein said effects comprise haptic vibrations by at least one vibrating actuators in said computing device.

18. The method of claim 14, wherein said computing device display comprises a head-mounted display.

19. The method of claim 14, wherein said computing device display comprises a handheld smartphone.

20. The method of claim 14, wherein said computing device display is semi-transparent.

* * * * *